No. 689,058. Patented Dec. 17, 1901.
L. BOIRAULT.
AUTOMATIC COUPLING FOR RAILWAY CARS.
(Application filed May 21, 1901.)
(No Model.) 7 Sheets—Sheet 1.

FIG. 1.

Witnesses:
Inventor
Louis Boirault
By
Attorneys.

No. 689,058.  
L. BOIRAULT.  
AUTOMATIC COUPLING FOR RAILWAY CARS.  
(Application filed May 21, 1901.)  
Patented Dec. 17, 1901.

(No Model.)

Witnesses:  
Inventor  
Louis Boirault

No. 689,058. Patented Dec. 17, 1901.
L. BOIRAULT.
AUTOMATIC COUPLING FOR RAILWAY CARS.
(Application filed May 21, 1901.)

(No Model.) 7 Sheets—Sheet 3.

Witnesses:

Inventor
Louis Boirault
By Munn
Attorneys.

No. 689,058. Patented Dec. 17, 1901.
L. BOIRAULT.
AUTOMATIC COUPLING FOR RAILWAY CARS.
(Application filed May 21, 1901.)

(No Model.) 7 Sheets—Sheet 5.

No. 689,058. Patented Dec. 17, 1901.
L. BOIRAULT.
AUTOMATIC COUPLING FOR RAILWAY CARS.
(Application filed May 21, 1901.)
(No Model.) 7 Sheets—Sheet 6.

No. 689,058. Patented Dec. 17, 1901.
L. BOIRAULT.
AUTOMATIC COUPLING FOR RAILWAY CARS.
(Application filed May 21, 1901.)

(No Model.) 7 Sheets—Sheet 7.

Witnesses:

Inventor
Louis Boirault
By Munn
Attorneys.

UNITED STATES PATENT OFFICE.

LOUIS BOIRAULT, OF CHARTRES, FRANCE.

AUTOMATIC COUPLING FOR RAILWAY-CARS.

SPECIFICATION forming part of Letters Patent No. 689,058, dated December 17, 1901.

Application filed May 21, 1901. Serial No. 61,211. (No model.)

*To all whom it may concern:*

Be it known that I, LOUIS BOIRAULT, engineer, a citizen of the Republic of France, residing at 51 Rue Chateaudun, Chartres, department of Eure-et-Loir, in the Republic of France, have invented certain new and useful Improvements in Automatic Couplings for Railway-Cars, of which the following is a specification.

My invention relates to a coupling by means of which the automatic coupling together of railway-cars can be practically attained. In the said coupling the draw or hooking head is provided with two bolts arranged inversely, the one relatively to the other, which are joined together by an adjusting-balance, so as to neutralize the disturbing effects of the shocks and jarrings, which would tend to make the said bolts slide if they were separate the one from the other. The said bolts are also so shaped as to make a long stroke, which makes them but little liable to open accidentally and allows of their being securely held against any strain caused by the draft. The hooking-head is connected to the draft-bar by an extensible frame having a compensating buffer-spring, and which prevents any play between the several parts which connect together the draft-bars of two adjacent cars, so that the said connecting parts are not liable to receive any violent shocks. The automatic coupling also comprises a controlling device for the said bolts, which allows not only of the coupling being unlocked by an attendant from either side of the train, but also of its being kept unlocked without any further action of the said attendant and also of the said bolts being set free by the attendant by acting on the said controlling device from either side of the train. The coupling is also provided with a locking device by means of which the automatic action of the said coupling can be suspended or reëstablished at will from either side of the train, so that, if required, the cars can after their separation be dealt with without their becoming coupled or yoked together.

The automatic coupling invented by me can be adapted without any modification to the railway-cars at present in use having couplings provided with screw tension-rods and concurrently with such couplings, so that the one or the other may be used.

The accompanying drawings show, by way of example, one form in which my invention may be carried out.

According to my invention the coupling comprises a sort of frame jointed to the end of the draft-bar and on which is jointed or pivoted a draw-head or coupling-plate provided with horns and bolts. A similar device is fitted to each car, so that when two cars are pushed one toward the other the horns of one of the coupling or hooking plates penetrate into the openings of the other plate and are automatically prevented from moving back by the bolts of the last-named plate. The pull of one car on the following one may therefore be borne by the draft or pull bars, the said frames, plates, bolts, and horns.

In the accompanying drawings, 1 designates the draft or pull bar.

The frame comprises a pin or axis 2, passing freely through the end of the draft or pull bar 1 and replacing the pin now in use, which serves to pivot the handle 3 of the tension-rod. On the ends of the pin 2 are fixed two slideways 4, in which can slide two iron V-shaped slides 5, connected together by a cylindrical brace 6. The frame thus formed by the parts 2 4 5 6 can expand and retract. Its expansion is limited by the abutments 7, integral with the slideways 4, and by the heel-pieces 8, formed on the slides 5. There is, moreover, a certain play between the said parts in order to allow of the pin 6 being slightly inclined relatively to the pin 2 when rounding curves or when zigzag movements take place. The slideways 4 are connected together by braces 9, riveted to the lugs 10 above and below the said slideways.

On the pin 6 the draw-head or hooking-plate 12 is pivoted, said hooking-plate being provided with two forwardly-extending horns or projections 13. Each draw-head or plate 12 has two openings 14, the horns or projections 13 of the one plate being adapted to enter the corresponding openings 14 of the opposing plate. It will be observed that the horns or projections and the openings of each plate are diagonally arranged. The plate 12 has a thicker back part, in which are formed slideways 15 for the bolts 16 in a direction which is transversal relatively to the said horns 13. Each of the said bolts 16 is subjected to the action of a spiral spring 17, which tends to push the same toward the opening 14. Each bolt 16 is also provided with a pin 18, which projects backwardly from the plate 12 and through a slot 19. The two bolts are connected together by a balancing-beam 20, pivoted on the center of the plate 12 and in ends of which are slots 21, which receive the pins 18.

Figure 7:
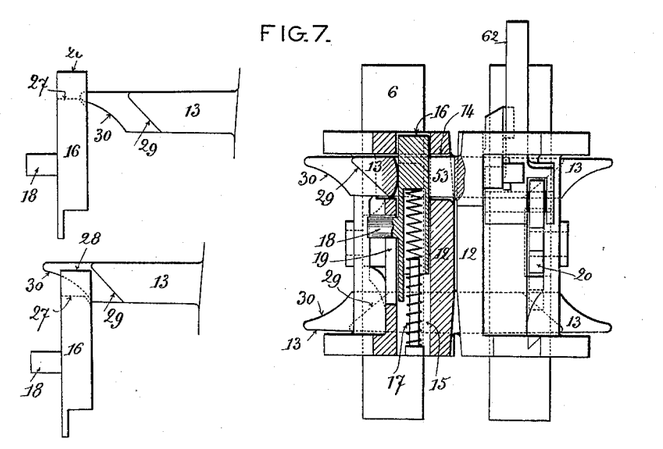
Fig. 7 is a horizontal section on the line G H of Fig. 5, together with a plan view of another plate hooked to the first one, and a detail view of a hooking-horn and a bolt shown in several positions.

In order that the bolts 16 shall be moved to a considerable extent by the horns 13 when the latter penetrate into the openings 14, (see Fig. 7,) they are provided with two inclined planes or blunt angles 27 and 28, the former, 27, of which is behind the other, and the horns are provided with corresponding inclined planes 29 and 30, the former, 29, of which is also behind the other. The result of this arrangement is that the plane 30 of the horn acts first on the plane 27 of the bolt and produces a first displacement of the latter and that the inclined plane 29 acts afterward on the inclined plane 28 in order to complete the stroke of the bolt. The latter is thus capable of resting on the opposite edges of the opening 14, where it can withstand considerable strain without any danger of breaking. The side faces of the horns are also inclined to a certain extent to facilitate the entry of the same into the openings 14. A spring 31, taking up the shocks, bears on a plate 32, fixed to the braces 9, and acts constantly by compression on the plate 12, such action tending to hold the said plate yieldingly in a normal direction with respect to the pin of the coupling and also to hold the abutments 7 in contact with the heel-pieces 8.

Figure 14:
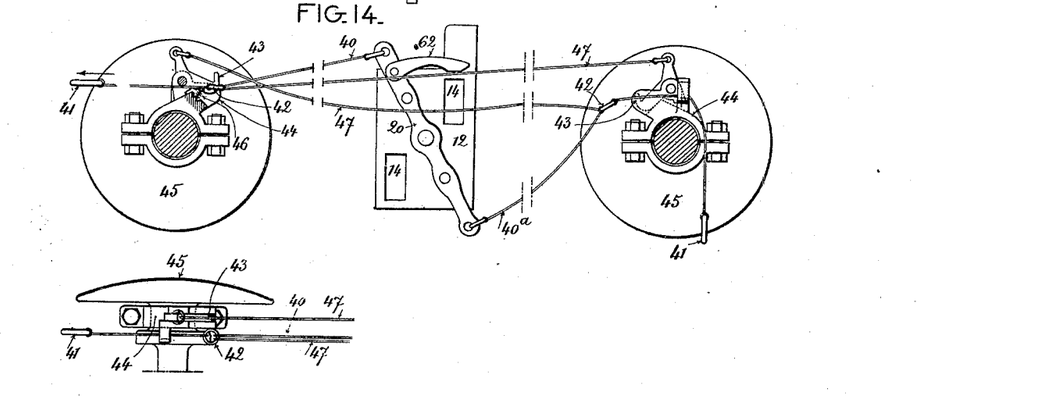
Fig. 14 shows the device for unlocking the couplings.

At each end of the balancing-beam 20 is attached a flexible steel wire rope or string 40 or 40ª, adapted to be pulled from the side of the car to disengage the bolts behind the openings 14 and to allow of the couplings being unhooked or unyoked. For the purpose of maintaining the said bolts disengaged without having to pull constantly on the rope or string 40 or 40ª, while leaving the said bolts free to be operated from either side of the car, I may use the device shown in Fig. 14. The string 40 is provided with a pulling-handle 41 and with a ring 42 to hang on a hook 43, movable in a support 44, fixed to one of the buffers 45 of the car. The said hook is subjected to the action of a spiral spring 46, which tends to push it outward, and it is connected by a string 47 to the string 40ª, located at the side opposite to that of the string 40. The arrangement being repeated in the same manner to the left and to the right of the balancing-beam 20, it will be understood that if one of the handles 41 is pulled—that to the left, for example—the two bolts 16 will be disengaged from the openings 14 and the ring 42 to the left may be hung on the hook 43 to the left, so that the said bolts will remain disengaged. When it is afterward desired to allow the bolts to return into their first position, all that need be done is to pull on either of the handles 41, for then the hook and the ring locking the system will be disengaged the one from the other.

Figure 1:
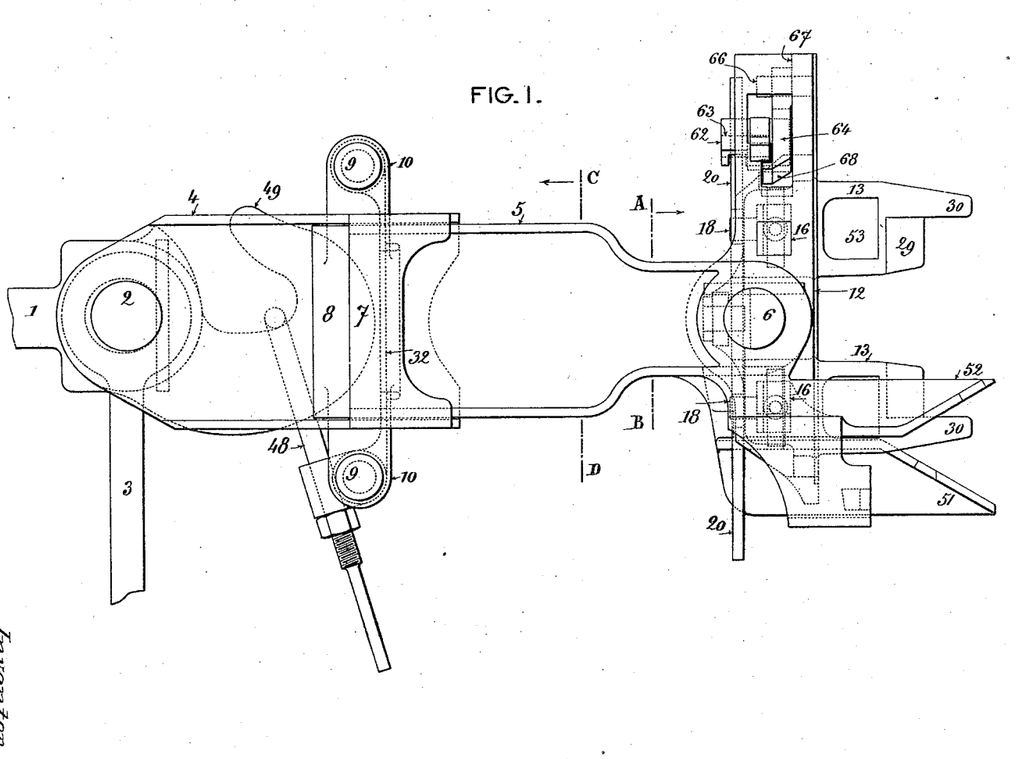
Figure 1 is a longitudinal vertical section of the coupling when at rest.
Figure 2:
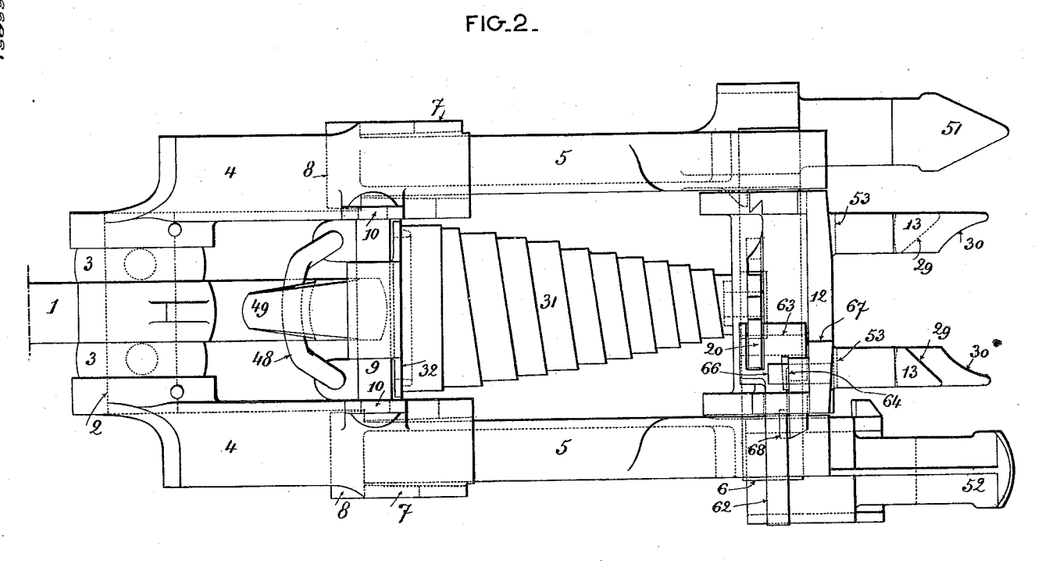
Fig. 2 is a plan view.
Figure 4:
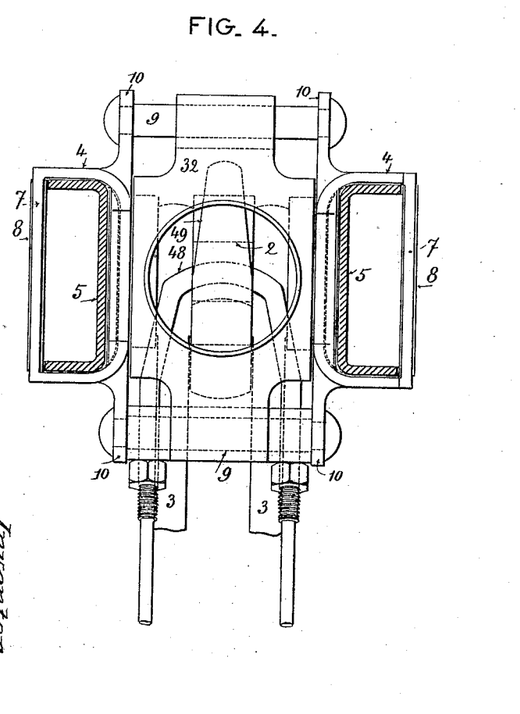
Fig. 4 is a section on the line C D of Fig. 1 looking in the direction of the arrow.
Figure 5:
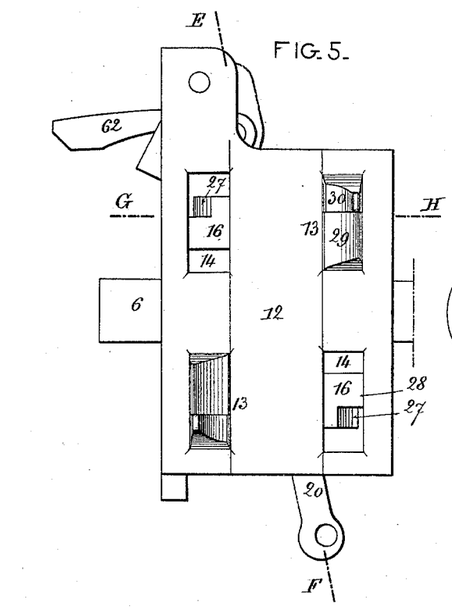
Fig. 5 is an elevation of the outer face of the hooking-plate.
Figure 6:
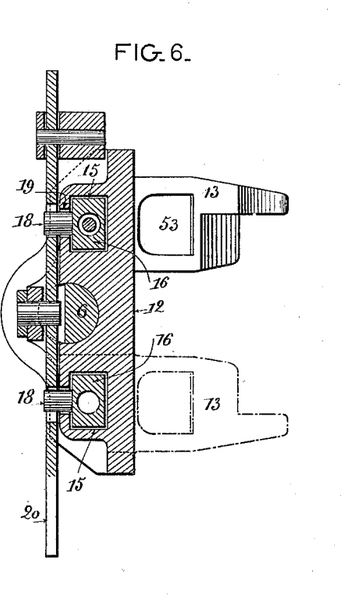
Fig. 6 is a section on the line E F of Fig. 5.
Figure 8:
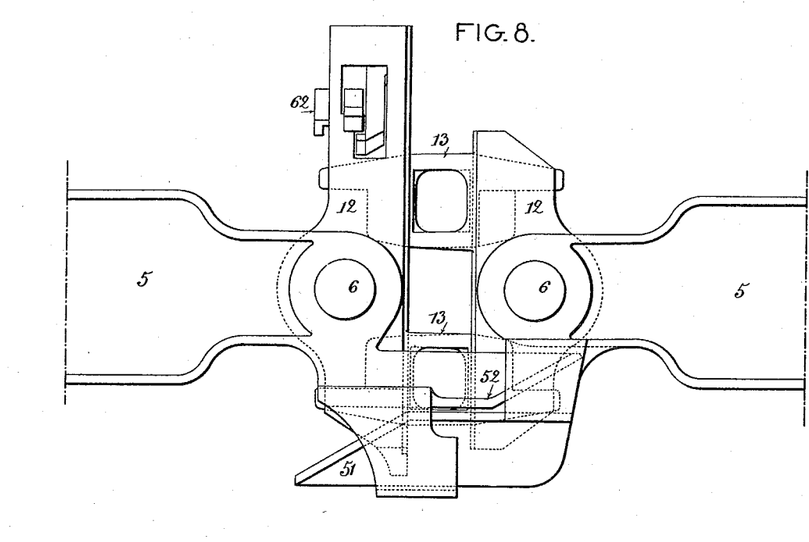
Fig. 8 is a partial lateral elevation showing how the two devices enter the one into the other.

There may exist between the pivot-pins of the couplings of the several cars appreciable differences in height, which may be easily compensated when the new coupling is fitted in place by suitably regulating its position when at rest. The said position may be determined by means of the clamp 48, Figs. 2 and 4, attached to one of the braces 9 and able to take on the usual coupling-hook 49. In order to insure the required penetration of the horns 13 into the openings 14, notwithstanding the difference in height of the cars differently loaded or the lateral movement of the pivot-pins of the couplings when rounding curves, each coupling is provided with a guide 51, (see Figs. 1, 2, and 8,) presenting inclined faces in both a vertical and horizontal direction and capable of acting on a corresponding part 52 of the coupling located opposite, so as to move it up if it is too low and to bring it inward or outward if it is too much to one side.

The operation of the automatic coupling constructed as hereinbefore described is as follows: When the couplings of two cars come opposite each other, the horns 13 are located in front of the openings or holes 14 in whatever manner the cars may be arranged. Their penetration into the said holes without any jarring on the coupling-plates 12 is insured by the guides 51 and 52. The bolts 16 are pushed against their springs as the horns penetrate into the openings 14 successively by the inclined planes 30 and 29 and then fall suddenly into the holes 53 of the said horns 13 under the action of the springs 17. From that moment no accidental cause can disengage the bolts which bolt the horns 13 of one coupling-plate 12 to the adjacent coupling-plate. The disturbing effects of jarring and vibration on the bolts are at each instant compensated and neutralized, because they act equally on both bolts, the balancing-beam 20 thus remaining in equilibrium.

The coupling may be provided with a catching or locking device for the purpose of maintaining automatically the drawn bolts without it being necessary to hang one of the strings 40 or 40ª on a hook or to wait until the couplings are separated, while allowing at the same time the bolts to penetrate automatically into fresh hooking or coupling horns when after the separation of the adjacent coupling another coupling will be pushed against the first one. The said catching or locking device is, moreover, so arranged that in case it should be interfered with during switching—for example, in leaving the bolts move forward through the openings of the coupling-plate—the automatic engagement of the couplings will be sure to take place.

Figure 3:
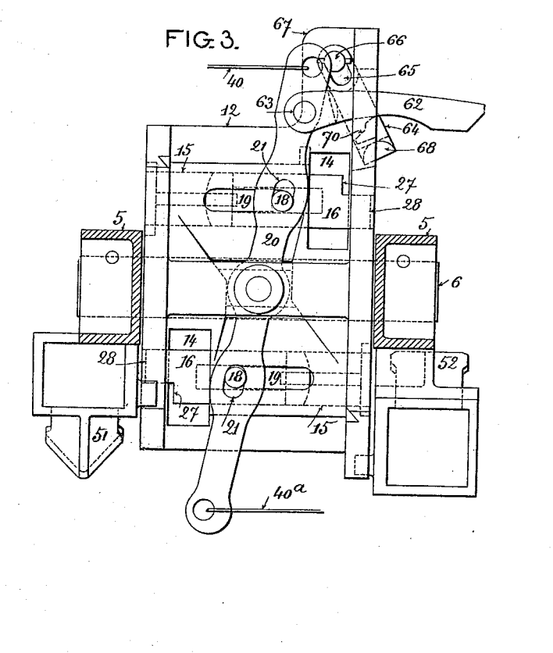
Fig. 3 is a vertical section on the line A B of Fig. 1 looking in the direction of the arrow.
Figure 9:
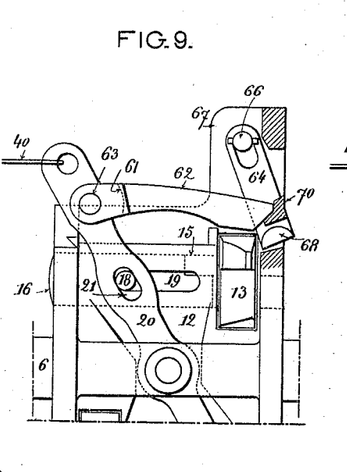
Figs. 9 to 11 show a clutch device in several positions.
Figure 10:
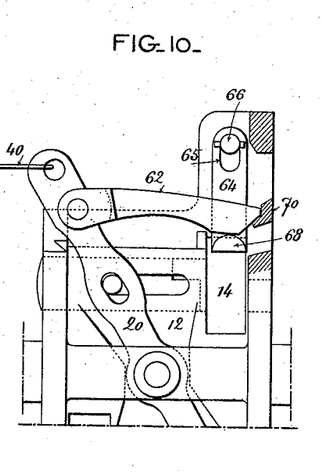
Figure 11:
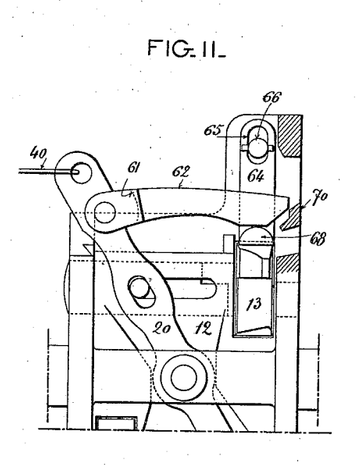

The catching or locking device to hold the drawn bolts back comprises a catch or pawl 62, pivoted at a suitable point, as 63, of the balancing-beam 20, and a finger 64, serving to disengage the pawl. The said finger 64 has a slot 65, through which projects a pin 66, fixed to a lug 67, integral with the aforesaid plate 12. The finger 64 is provided with a projection 68, located under the pawl 62, and it can be impinged by a projection 61 on the pawl 62. When the couplings are fixed together, the said pawl 62 and the said finger 64 are projected on the right side of the plate 12, as shown in Fig. 3. When one of the strings 40 is pulled or 40ª attached to the balancing-beam 20 to withdraw the bolts 16 from the horns 13, the pawl 62 is moved toward the left, and when the bolts are completely withdrawn from the horns 13 the said pawl 62 falls to the left of an abutment 70, formed on the plate 12, so as to prevent the bolts and balancing-beam from returning into their original position. The pull on the string 40 or 40ª may then cease. (See Fig. 9.) When the couplings are afterward separated, the finger 64 moves by gravitation around the pivot 66 and comes opposite the opening 14 from which the horn 13 has been withdrawn. The pawl 62 remains lowered. (See Fig. 10.) When a second coupling comes against the first, the horn 13 penetrates into the opening 14 and its upper inclined plane lifts the finger 64, the slot 65 of which slides freely on the pin 66. The lifting of the finger 64 is followed by the lifting of the pawl 62 by the heel 68, and consequently by the disengagement of the said pawl from above the abutment or pin 70. (See Fig. 11.) The bolts and the balancing-beam thus become free to return to their first position as soon as the bolts meet with the openings 53 in the horns 13. The finger 64, which had been moved toward the left by the projection 61 of the pawl 62, also returns to its first position, as shown in Fig. 3.

In case the pawl 62 should be accidentally disengaged from the abutment 70 before two couplings are pushed one toward the other they would be sure to be automatically fixed together nevertheless, because the pawl 62 is of such a length that when it is moved backward by the action of the horns 13 on the bolts 16 it cannot fall behind the abutment 70. In this case the bolts and the balancing-beam will be able to return to their original position under the action of the springs 17, thus bringing about the engagement of the bolts in the openings 53 of the horns, as previously described.

Figure 12:
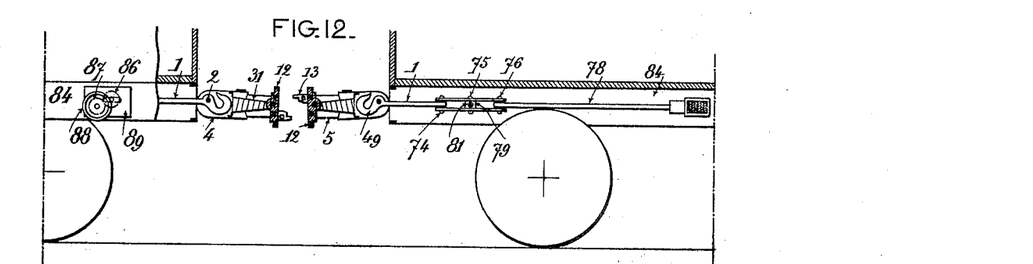
Figs. 12 and 13 show in elevation and in plan view how the the couplings work on the cars.
Figure 13:
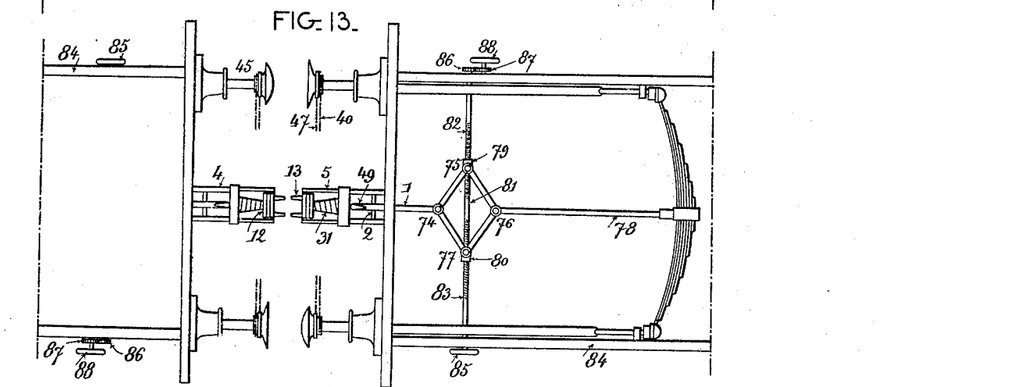

The automatic coupling is particularly intended for the cars of freight-trains. However, it may be easily applied to passenger-trains on the condition of its being supplemented by a stretching device, Figs. 12 and 13, in place of the one now in use, which is given up or dispensed with. The said stretching device comprises a double parallelogram 74 75 76 77, of which the two apices 74 and 76 are pivoted, respectively, to two parts 1 and 78 of the draft or pull bar, the said parts being independent of each other, and the two other apices 75 and 77 are pivoted to the nuts 79 and 80, mounted on a transversal rod 81, having two parts 82 and 83 screw-threaded, the one to the left and the other to the right. The ends of the said rod 81 may slide through horizontal holes made in the web of the part 84 of the car, one of the said ends having a hand-wheel 85, serving to turn the same, and the opposite end being provided with a pinion 86, meshing with a second pinion 87, the spindle of which is also provided with an operating hand-wheel 88. The two pinions 86 and 87 are carried by a plate 89, slidable on the part 84. With this arrangement when either of the hand-wheels 85 and 88 is turned in a given direction the nuts 79 and 80 are moved either nearer to or farther from each other, the apices 74 and 76 of the parallelograms being thus correspondingly moved, thus bringing the couplings nearer together or moving the same wider apart.

I claim—

1. The combination with a pivoted extensible and contractible frame, of a draw-head having diagonally-arranged projections and diagonally-arranged apertures, the projections having transverse openings; spring-pressed locking-bolts mounted in the draw-head and adapted to enter the openings of the projections of an opposing draw-head; a lever pivoted at its middle on the draw-head and connecting and controlling the locking-bolts; a pawl pivoted on the lever; a keeper on the draw-head adapted to be engaged by the pawl; and means actuated by the projection of an opposing draw-head to release the pawl and lever.

2. In a car-coupler, the combination of a draw-head having diagonally-arranged projections and diagonally-arranged apertures, the projections being formed with transverse openings; spring-pressed locking-bolts arranged to move in opposite directions and adapted to enter the transverse openings of corresponding projections of the opposing draw-head; a lever pivoted at its middle on the draw-head, whereby the said locking-bolts are operated simultaneously; and means for holding the lever in one position, said means being released by the projection of an opposing draw-head.

3. The combination with a draw-head having diagonally-arranged projections and diagonally-arranged apertures, the projections having transverse openings, of locking-bolts slidable in opposite directions; a lever pivoted on the draw-head whereby the said locking-bolts are simultaneously operated; a swinging pawl carried by the lever, a keeper on the draw-head for the pawl; and a finger carried by the draw-head and arranged to lift the pawl from the keeper when actuated by the projection of an opposing draw-head.

4. The combination with a draw-head having a keeper and a releasing-finger; of a locking-bolt lever pivoted at its middle on the draw-head; a pawl pivoted on the lever; and a keeper on the draw-head for the pawl and lever, said pawl being released from the keeper by the releasing-finger when two draw-heads are brought together.

5. A car-coupler having a draw-head provided with openings, separate locking devices arranged to traverse the said openings and a lever pivoted at its middle on the draw-head, said lever connecting the locking devices and serving to operate them in unison; and means for holding the lever and locking-bolts in inoperative position until released by an opposing draw-head.

6. A car-coupler having a draw-head provided with locking devices; a centrally-pivoted lever connecting and controlling the locking devices; a catch-pawl pivoted on the lever; an abutment on the draw-head serving to hold the catch-pawl when the lever is thrown in one position; and a finger mounted on the draw-head and adapted to raise the catch-pawl from the abutment.

In testimony that I claim the foregoing as my invention I have signed my name in presence of two subscribing witnesses.

LOUIS BOIRAULT.

Witnesses:
EUGENE WATTIER,
MAURICE RUUX.